United States Patent
Reed et al.

(10) Patent No.: US 12,260,334 B2
(45) Date of Patent: *Mar. 25, 2025

(54) NEURAL PROGRAMMING

(71) Applicant: DeepMind Technologies Limited, London (GB)

(72) Inventors: Scott Ellison Reed, Atlanta, GA (US); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,924

(22) Filed: Oct. 30, 2023

(65) Prior Publication Data

US 2024/0177001 A1    May 30, 2024

Related U.S. Application Data

(63) Continuation of application No. 16/859,811, filed on Apr. 27, 2020, now Pat. No. 11,803,746, which is a
(Continued)

(51) Int. Cl.
*G06N 3/044*    (2023.01)
*G06N 3/08*    (2023.01)
*G06N 20/00*    (2019.01)

(52) U.S. Cl.
CPC ............. *G06N 3/08* (2013.01); *G06N 3/044* (2023.01); *G06N 20/00* (2019.01)

(58) Field of Classification Search
CPC ........... G06N 3/08; G06N 3/044; G06N 20/00
See application file for complete search history.

(56) References Cited

U.S. PATENT DOCUMENTS 9,015,093 B1    4/2015    Commmons
9,037,454 B2    5/2015    Miolov et al.
(Continued)

FOREIGN PATENT DOCUMENTS

CN    1682243 A    10/2005
CN    101131695 A    2/2008
(Continued)

OTHER PUBLICATIONS

Grefenstette, Edward, et al. "Learning to transduce with unbounded memory." Advances in neural information processing systems 28 (2015). (Year: 2015).*

(Continued)

*Primary Examiner* — Michael J Huntley
*Assistant Examiner* — Sehwan Kim
(74) *Attorney, Agent, or Firm* — Fish & Richardson P.C.

(57) ABSTRACT

Methods, systems, and apparatus, including computer programs encoded on computer storage media, for neural programming. One of the methods includes processing a current neural network input using a core recurrent neural network to generate a neural network output; determining, from the neural network output, whether or not to end a currently invoked program and to return to a calling program from the set of programs; determining, from the neural network output, a next program to be called; determining, from the neural network output, contents of arguments to the next program to be called; receiving a representation of a current state of the environment; and generating a next neural network input from an embedding for the next program to be called and the representation of the current state of the environment.

20 Claims, 4 Drawing Sheets

Related U.S. Application Data continuation of application No. 15/349,966, filed on Nov. 11, 2016, now Pat. No. 10,635,974.

(60) Provisional application No. 62/285,950, filed on Nov. 12, 2015.

(56) References Cited

U.S. PATENT DOCUMENTS

| | | | |
|---|---|---|---|
| 9,037,464 | B1 | 5/2015 | Mikolov et al. |
| 2003/0200075 | A1 | 10/2003 | Meng et al. |
| 2015/0066496 | A1 | 3/2015 | Deoras et al. |
| 2017/0045894 | A1 | 2/2017 | Canoy et al. |

FOREIGN PATENT DOCUMENTS

| | | |
|---|---|---|
| CN | 101625735 A | 1/2010 |
| CN | 104709288 A | 6/2015 |

OTHER PUBLICATIONS

Anderson. "Neural reuse: A fundamental organizational principle of the brain," Behavioral and Brain Science, 33.04, Aug. 1, 2010, 69 pages.

Andre et al. "Programmable reinforcement learning agents," Advances in Neural Information Processing Systems, Dec. 2001, 7 pages.

Aviles et al. "A recurrent neural network approach for 3d vision-based force estimation" IEEE, Oct. 2014, 6 pages.

Das et al. "Learning Context-free Grammars: Capabilities and Limitations of a Recurrent Neural Network with an External Stack Memory," Advances in Neural Information Processing Systems 5, Jan. 1, 1993, 6 pages.

Dietterich. "Hierarchical reinforcement learning with the MAXQ value function decomposition," Journal of Artificial Intelligence Research, 2000, 77 pages.

Donnarumma et al. "A programmer-interpreter neural network architecture for prefrontal cognitive control," International Journal of Neural Systems, Sep. 2015, 25(6):1550017, 18 pages.

Donnarumma et al. "Programming in the brain: A neural network theoretical framework," Connection Science, 24(2-3), Sep. 1, 2012, 22 pages.

Donnarumma, Francesco, et al. "A programmer-interpreter neural network architecture for prefrontal cognitive control." International journal of neural systems 25.06 (2015): 1550017.

EP Summons to attend oral proceedings pursuant to Rule 115(1) EPC in European Appln. No. 16806344.4, dated Feb. 7, 2020, 7 pages.

Fidler et al. "3D object detection and viewpoint estimation with a deformable 3D cuboid model," Advances in neural information processing systems, 2012, 9 pages.

Graves et al. "Neural Turing machines," arXiv preprint arXiv:1410.5401, Oct. 20, 2014, 26 pages.

Greffenstette et al. "Learning to Transduce with Unbounded Memory," Advances in Neural Information Processing Systems, Nov. 3, 2015, 14 pages.

Hochreiter et al. "Long short-term memory," Neural computation, 9(8), Nov. 15, 1997, 46 pages.

Huang et al., "Research and Implementation of Intelligent Neural Network Programming Language," Computer Engineering, 2007, 33(4):32-36 (with English abstract).

International Search Report and Written Opinion in International Application No. PCT/US2016/061682, mailed on Feb. 13, 2017, 13 pages.

Joulin et al. "Inferring algorithmic patterns with stack-augmented recurrent nets," Advances in neural information processing systems, 2015, 9 pages.

Kaiser et al. "Neural gpus learn algorithms," arXiv preprint arXiv:1511.08228, Nov. 25, 2015, 9 pages.

Kingma et al. "Adam: A method for stochastic optimization," arXiv preprint arXiv:1412.6980, Dec. 22, 2014, 15 pages.

Kolter et al. "Hierarchical apprenticeship learning with application to quadruped locomotion," Advances in Neural Information Processing Systems, 2007, 8 pages.

Kurach et al. "Neural random-access machines," arXiv preprint arZiv: 1511.06392v.3, Feb. 9, 2016, 17 pages.

Mou et al. "Building program vector representations for deep learning," arXiv preprint arXiv: 1409.3358, Sep. 11, 2014, 11 pages.

Neelakantan et al. "Neural programmer: Inducing latent programs with gradient descent," arXiv preprint arXiv:1511.04834, Nov. 16, 2015, 18 pages.

Office Action in Chinese Appln. No. 201680066431.5, dated Aug. 2, 2021, 14 pages (with English translation).

OReilly et al. "Complementary learning systems," Cognitive Science, 38(6), Aug. 1, 2014, 20 pages.

Reed et al. "Neural Programmer-Interpreters," arXiv preprint arXiv 1511.06279v4, Feb. 29, 2016, 13 pages.

Rothkopf et al. "Modular inverse reinforcement learning for visuomotor behavior," Biological Cybernetics, 107(4), Aug. 1, 2013, 24 pages.

Rumelhart et al. "Parallel distributed processing: Explorations in the microstructure of cognition", MIT Press, 1986, 32 pages.

Schaul et al. "Universal value function approximators," International Conference on Machines Learning, 2015, 9 pages.

Schmidhuber. "Learning to control fast-weight memories: An alternative to dynamic recurrent networks," Neural Computation, 4(1), Jan. 1992, 9 pages.

Schneider et al. "Controlled and automatic processing: behavior, theory, and biological mechanism," Cognitive Science, 27(3), Jan. 6, 2003, 35 pages.

Serban, et al. "Hierarchical neural network generative models for movie dialogues" arXiv, 2015, 11 pages.

Sutskever et al. "Sequence to sequence learning with neural networks," In Advances in Neural Information Processing Systems, 2014, 9 pages.

Sutskever et al. "Using matrices to model symbolic relationship," Advances in Neural Information Processing Systems, 2009, 8 pages.

Sutton et al. "Between MDPs and semi-MDPs: A framework for temporal abstraction in reinforcement learning," Artificial Intelligence, 112(1-2), Aug. 1999, 31 pages.

Van Rossum, et al "Python frequently asked questions" Institute for Theoretical Physics, 2014, 129 pages.

Vinyals et al. "Pointer networks," Advances in Neural Information Processing Systems, 2015, 9 pages.

Zaremba et al. "Learning simple algorithms from examples," arXiv preprint arXiv:1511.07275, 2015, 9 pages.

Zaremba et al. "Learning to execute," arXiv preprint arXiv, Oct. 17, 2014, 25 pages.

Zaremba et al. "Reinforcement learning neural turing machines," arXiv preprint arXiv: 1505.00521 362, May 2015, 13 pages.

\* cited by examiner

NEURAL PROGRAMMING

CROSS-REFERENCE TO RELATED APPLICATIONS

This is a continuation of U.S. application Ser. No. 16/859,811, filed on Apr. 27, 2020, which is a continuation of U.S. application Ser. No. 15/349,966, filed on Nov. 11, 2016 (now U.S. Pat. No. 10,635,974), which claims priority to U.S. Provisional Application No. 62/285,950, filed on Nov. 12, 2015. The disclosures of the prior applications are considered part of and are incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to performing machine learning tasks by invoking a sequence of programs to interact with an environment.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By learning to compose lower-level programs to express higher-level programs, the neural network system described in this specification reduces sample complexity and increases generalization ability. The neural network system can harness the environment, i.e., by modifying the environment during execution of the machine learning task, to cache intermediate results of computation, lessening the long-term memory burden on recurrent hidden units of the core recurrent neural network. The neural network system can learn, i.e., can be trained to, effectively model compositional programs using an initial set of programs. By implementing a program memory that stores learnable program embeddings, programs can be re-used, i.e., across different machine learning tasks, in a continual manner.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
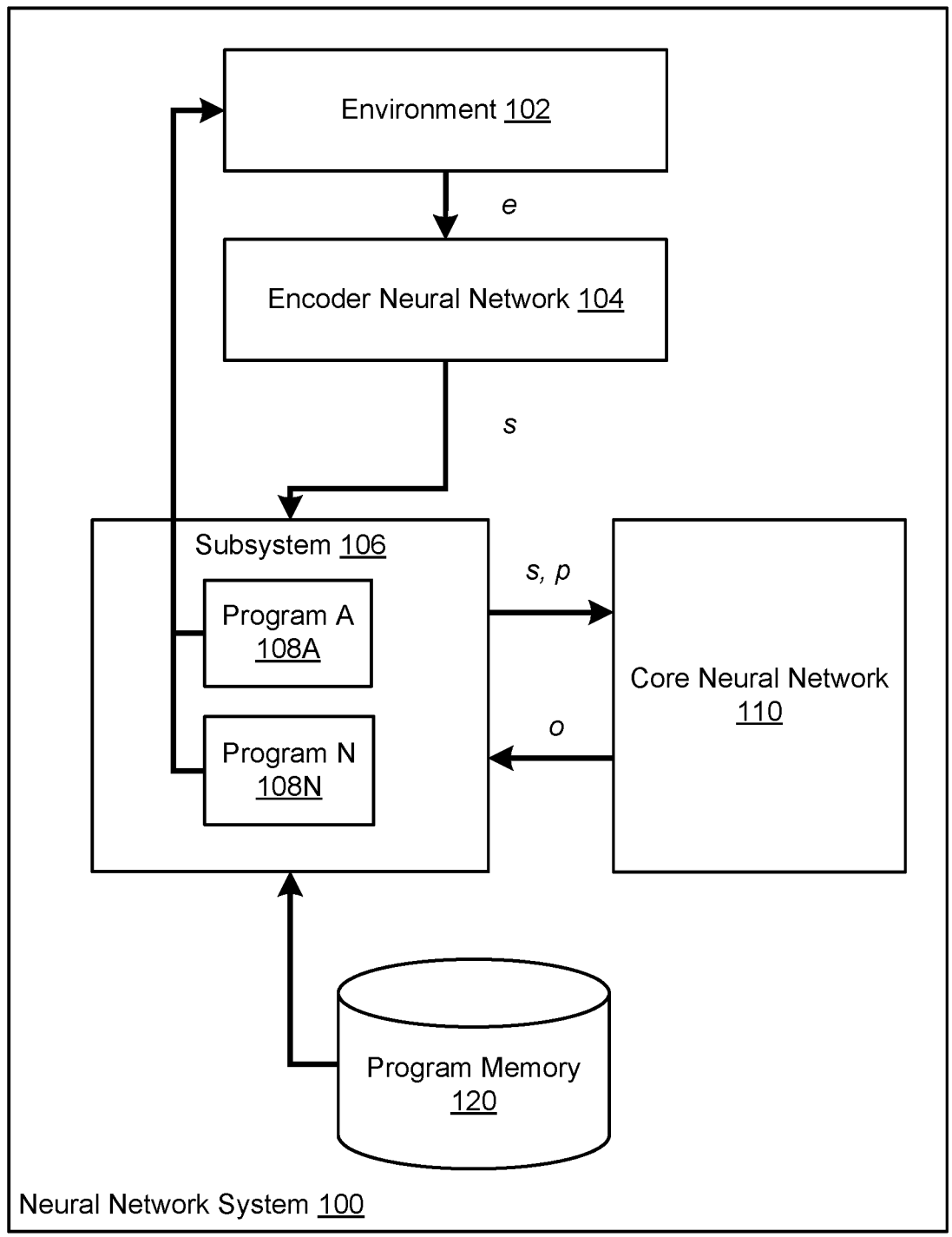
FIG. 1 shows an example neural network system.

FIG. 1 shows an example neural network system 100. The neural network system 100 is an example of a system implemented as computer programs on one or more computers in one or more locations, in which the systems, components, and techniques described below are implemented.

The neural network system 100 is a system that performs a machine learning task by interacting with an environment 102.

For example, the machine learning task can be to change the position of an object in the environment, e.g., to move a camera from an initial position to a canonical position, i.e., a position that captures a canonical pose of another object in the environment. For example, the task can be to position the camera so that it captures the other object at a target angle and from a target elevation. As another example, the task can be to cause a mechanical agent to move an object from an initial position in the environment to a target position.

As another example, the machine learning task can be to sort a set of numbers in the environment, i.e., numbers in an array displayed in a user interface, according to a predefined property or to perform a mathematical operation on the set of numbers.

As another example, the machine learning task can be to cause a mechanical agent to navigate to a specific location, i.e., while satisfying certain constraints.

As another example, the machine learning task can be to perform a task on behalf of a user of a mobile device or other computer. For example, the machine learning task can be to receive a high-level command and to execute a sequence of sub-tasks to satisfy the command, e.g., making a restaurant reservation for multiple people and creating a calendar entry for the meal.

In particular, the neural network system 100 interacts with the environment by invoking programs from a set of multiple programs 108A-N. In general, at least some of the programs in the set cause the environment to change state when executed.

For example, in the case where the machine learning task is to change the position of an object in the environment, one or more of the programs in the set can cause the object to change position, e.g., one program can cause translational motion in accordance with arguments to the program while another can cause rotational motion in accordance with arguments to the program.

As another example, in the case where the machine learning task is to modify, e.g., sort or perform a mathematical operation on, numbers displayed on a scratchpad, i.e., a graphical user interface, one or more programs can move a pointer to different positions in the scratchpad, while one or more other programs can write a value to the current position of the pointer.

In particular, the neural network system 100 includes an encoder neural network 104, a subsystem 106, and a core neural network 110.

The encoder neural network 104 is neural network that receives a state representation e of the environment and generates a fixed-length encoding s, e.g., a fixed-length vector of numeric values, that is an encoding of the current state of the environment 102. Generally, the architecture of the encoder neural network 104 is dependent on the domain to which the encoder neural network 102 is being applied, i.e., to the environment 102, to the machine learning task, or both.

For example, in the case where the machine learning task is to change the position of an object in the environment, the state representation can include a current image of the environment, e.g., from the perspective of the object or from a fixed perspective, and data identifying the target position for the object. The data identifying the target position can be, e.g., an image of the target position or coordinates of the target position. In this case, the encoder neural network 104 can be a convolutional neural network that encodes the image of the environment, the data identifying the target coordinates, and the arguments defined by the previous neural network output (as will be described in more detail below).

As another example, in the case where the machine learning task is to modify numbers displayed on a scratchpad, the state representation can be the values at the current position at each of the pointers in the scratchpad. In this case, the encoder neural network 104 can be a multi-layer perceptron that encodes the values at each point and the arguments defined by the previous neural network output.

The subsystem 106 receives the encoding s and generates a neural network input for the core neural network 110 from the encoding s and an embedding p for a currently invoked program from the set of programs 108A-N. The embedding is a vector or other ordered collection of numeric vectors that represents the currently invoked program. Program embeddings will be discussed in more detail below. Generating the neural network input from the encoding s and the embedding p is described below with reference to FIG. 4.

The core neural network 110 is a recurrent neural network, e.g., an LSTM neural network having one or more LSTM layers, that is configured to, during the performance of the machine learning task, process a sequence of neural network inputs to generate a respective neural network output for each neural network input.

In particular, for each neural network input, the core neural network 110 is configured to process the neural network input to update a current hidden state of the core neural network 110. The core neural network 110 is configured to then generate the neural network output by applying multiple functions to the updated hidden state to generate the neural network output. Generally, each function is applied to generate a respective portion of the neural network output. In particular, one function is applied to the updated hidden state to generate a probability that the currently invoked program should be ended, another function is applied to the updated hidden state to generate a key that identifies the next program to be invoked, and another function is applied to the updated hidden state to generate arguments for the next program. Each of the functions may be, e.g., a different transformation that is applied to the hidden state in accordance with a respective set of parameters.

The subsystem 106 receives the neural network output o and uses the neural network output o and a program memory 120 to invoke one of the programs 108A-N.

In particular, the program memory 120 stores, for each of the programs 108A-N, a key that identifies the program and an embedding, e.g., i.e., a vector or other ordered collection of numeric vectors that represents the program. The embeddings may be determined as part of training the core neural network 110. In particular, a new program can be made available to the neural network system 120 by storing an initial embedding for the program in the program memory 120. The initial embedding can then be adjusted by training the core recurrent neural network 110 on a machine learning task that makes use of the new program.

The subsystem 106 uses the keys stored in the program memory 120 to identify a new program to be invoked using the key specified by the neural network output and provides the argument defined by the neural network output as input to the newly invoked program.

As described above, by invoking the new program, the subsystem 106 may cause the environment to change state. That is, at least one of the programs in the set of programs 108A-N acts or causes an agent to act to impact the environment.

Once the program has been invoked and a new state representation has been received, the subsystem 106 accesses the program embedding for the newly invoked program from the program memory 120 and uses the program embedding for the newly invoked program in generating the next neural network input.

If the invoked program's execution does not impact the environment, the system can still receive another state representation, i.e., in cases where the environment can change without interaction by a program, or can generate the next neural network input from the same state representation.

Figure 2:
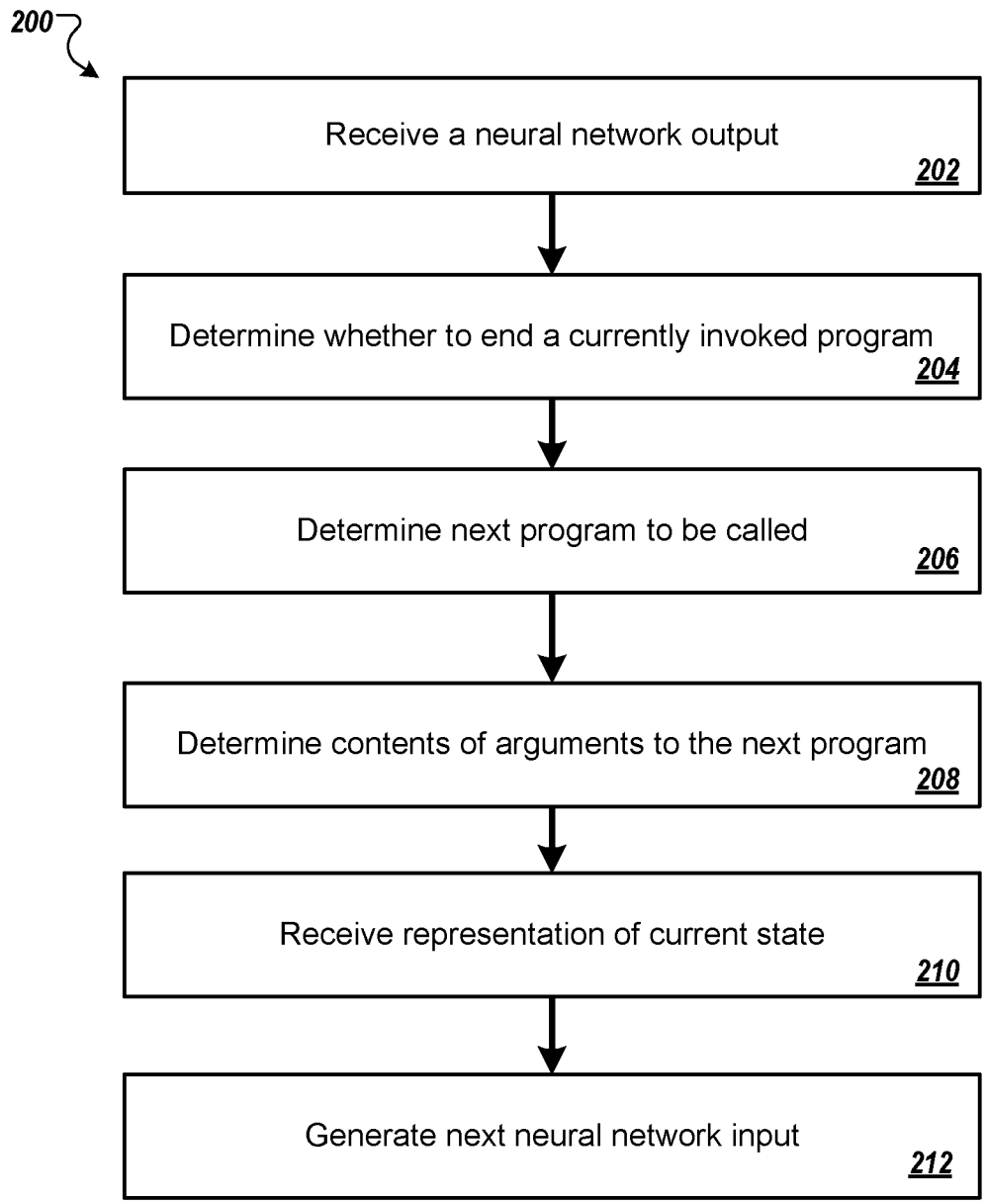
FIG. 2 is a flow diagram of an example process for generating a next neural network input from a current neural network output.

FIG. 2 is a flow diagram of an example process 200 for generating a next neural network input from a current neural network output. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system obtains a neural network output (step 202). The neural network output is one of a sequence of neural network outputs generated by the core neural network. In particular, the system processes a preceding neural network input using the core neural network to generate the neural network output.

The system determines, from the neural network output, whether or not to end a currently invoked program (step 204). In particular, the neural network output includes a designated portion that is a probability with which the current invoked program should be ended. A designated portion of an output is a predetermined portion of the neural network output that has been designated, e.g., by a system administrator, so that the same predetermined portion of each neural network output is treated the same way by the system. That is, the same element of each neural network output will hold the value that is the probability with which the current invoked program should be ended. If the probability exceeds a threshold, e.g., 0.5, 0.6, or 0.7, the system determines to end the currently invoked program. If the probability does not exceed the threshold, the system determines not tend the currently invoked program. Determining to end the currently invoked program is described in more detail below with reference to FIG. 3.

The system determines the next program to be called (step 206). In particular, the neural network output includes a designated portion that is the key for the next program to be called. To determine the next program to be called, the system compares the key specified by the neural network output to the keys for the programs in the program memory and selects the program that has a key that most closely matches the key in the neural network output, e.g., that has the largest dot product with the key in the neural network output.

The system determines the arguments to the next program to be called (step 208). In particular, the neural network output includes a designated portion that defines the arguments for the next program.

The system obtains a representation of the current state of the environment (step 210).

In particular, the system invokes the next program with the determined arguments, and in some cases, the execution of the next program will cause a change in the environment. That is, as described above, one or more of the programs, when executed, acts on the environment in a manner that is specific to the program and the task that is being performed by the system.

Once the next program has performed the action, the system can receive an observation of the current state of the environment and generate the representation using an encoder neural network. Generating the representation will be discussed in more detail below with reference to FIG. 4.

The system generates the next neural network input from an embedding for the next program to be called and the representation of the current state of the environment (step 212). That is, the system accesses the program memory or the maintained stack to obtain the embedding for the next program and generates the next neural network input by combining the embedding and the state representation. Generating the next neural network input is described in more detail below with reference to FIG. 4.

The process 200 can be performed repeatedly by the system until the instance of the task has been completed, i.e., the environment is in a terminal state.

The instance of the task can be an instance for which the desired output, i.e., the sequence of programs invoked by the system and the arguments to those programs determined by the system, is not known. The system can also perform the process 200 on inputs in a set of training data, i.e., a set of inputs for which the output that should be predicted by the system is known, in order to train the system, i.e., to determine trained values for the parameters of the core neural network and the embeddings of the programs. For example, the training data can be sequence traces of instances of the task.

Because the components of the system are entirely differentiable, the process 200 can be performed repeatedly on inputs selected from a set of training data as part of a conventional machine learning training technique to train the neural network, e.g., a stochastic gradient descent backpropagation through time training technique. In some cases, during training, a curriculum learning technique can be used to reduce training time and to improve the results of the training.

Figure 3:
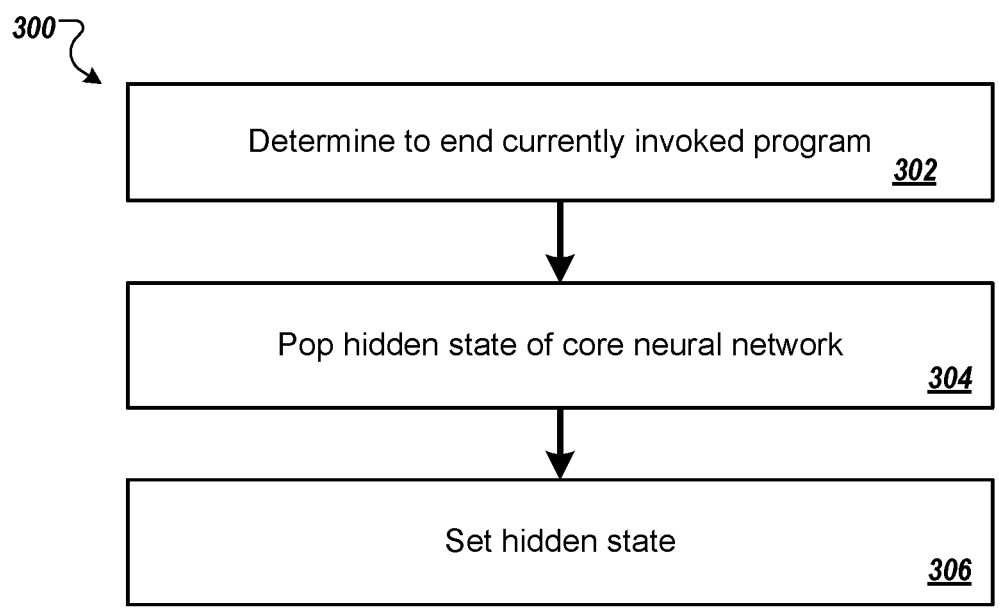
FIG. 3 is a flow diagram of an example process for ending a currently invoked program.

FIG. 3 is a flow diagram of an example process 300 for ending a currently invoked program. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system determines to end the currently invoked program (step 302). As described above, the system can determine to end the program when the probability defined by the neural network output exceeds a threshold value.

The system pops the hidden state of the core neural network when the calling program was selected and the embedding for the calling program off of a program call stack (step 304). As described above, some of the programs in the set of programs perform actions that cause a change in the state of the environment. Other programs, however, can call subprograms, i.e., the programs that act on the environment or other programs in the set of programs. These programs are referred to in this specification as calling programs. That is, when a new program is invoked as a result of another program calling the new program, the system adds the hidden state of the core neural network as of the invocation of the new program and the embedding for the new program to the top of a program call stack. When the system determines to end a currently invoked program, the system pops the top hidden state and embedding off of the stack. In some implementations, rather than maintain the embeddings in the stack, the system instead maintains program keys and uses the program keys to obtain the corresponding embeddings from the program memory. Additionally, in some implementations, while the storage of caller states is logically represented as a program call stack, the system can recursively maintain the caller core states and no explicit stack needs to be employed.

The system sets the hidden state of the core neural network to be the popped hidden state (step 306). That is, the system replaces the current hidden state of the core neural network with the popped hidden state, i.e., the hidden state of the core neural network when the calling program was invoked. Thus, the popped hidden state will be used by the core neural network in processing the next neural network input.

Figure 4:
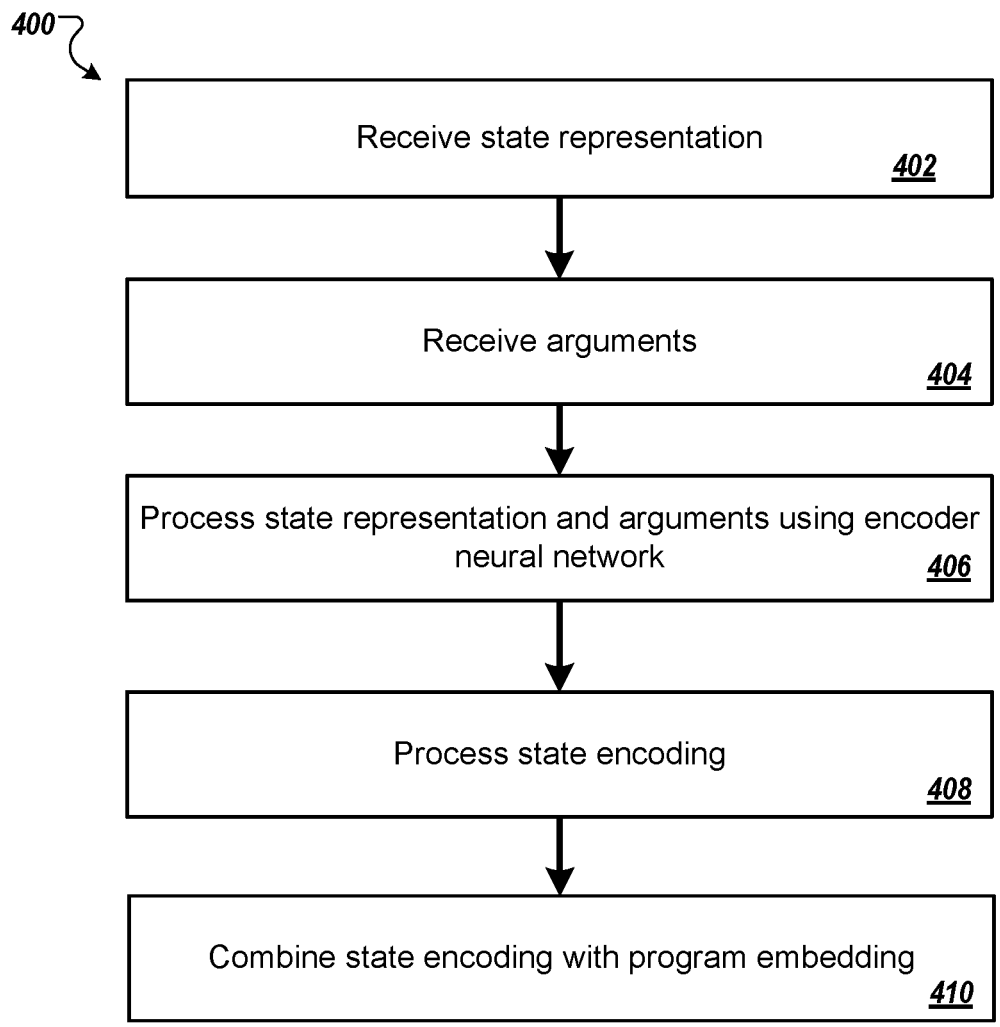
FIG. 4 is a flow diagram of an example process for generating a neural network input.

FIG. 4 is a flow diagram of an example process 400 for generating a neural network input. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system receives a state representation characterizing the current state of the environment (step 402)

The system receives arguments that were determined by the system for the previously invoked program (step 404).

The system processes the state encoding and the arguments using an encoder neural network to generate a fixed-length state encoding (step 406). As described above, the configuration of the encoder neural network is domain-specific, i.e., specific to the environment, to the task, or both.

The system processes the state encoding and the program embedding for the currently invoked program to generate the neural network input (step 408). Generally, the system combines the state encoding and the program embedding to generate the neural network input. For example, in some cases, the system concatenates the state encoding and the program embedding and then processes the concatenation through one or more neural network layers, e.g., one or more multi-layer perceptron layers followed by a linear decoder layer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system for performing a machine learning task by invoking one or more programs selected from a set of programs that, when invoked, cause an environment to transition into a different state, the neural network system comprising:

a core neural network configured to receive a sequence of neural network inputs and to generate a sequence of neural network outputs;

a memory storing, for each program in the set of programs, a key identifying the program and an embedding for the program, wherein the embedding for the program is a collection of numeric values that represents the program, wherein the embeddings for the programs in the set of programs have been determined through training on a set of training data, and wherein one or more of the neural network inputs are generated based on an embedding for one of the programs in the set of programs; and a subsystem configured to, for each neural network output:

determine, from the neural network output, whether or not to call a new program from the set of programs;

in response to determining to call a new program:

determine, from the neural network output, a next program to be called;

determine, from the neural network output, contents of arguments to the next program to be called;

invoke the next program with the contents of the arguments to the next program to cause the environment to transition into a current state;

obtain a representation of the current state of the environment; and generate a next neural network input from the representation of the current state of the environment.

2. The neural network system of claim 1, wherein generating the next neural network input comprises:

extracting a state encoding from the representation of the current state using a domain-specific encoder; and generating the next neural network input using the state encoding.

3. The neural network system of claim 1, wherein determining the next program to be called comprises:

determining, from the neural network output, a program key; and selecting a program from the set of programs using the program key.

4. The neural network system of claim 3, wherein selecting a program from the set of programs using the program key comprises:

selecting a program from the set of programs having a key that is most similar to the program key.

5. The neural network system of claim 1, wherein the core neural network has been trained on training data that comprises execution traces.

6. The neural network system of claim 5, wherein the embeddings for the programs in the set of programs have been determined during the training of the core neural network on the training data that comprises the execution traces.

7. The neural network system of claim 1, wherein the core neural network comprises a recurrent neural network.

8. The neural network system of claim 1, wherein the representation of the current state is an image.

9. The neural network system of claim 1, wherein the subsystem is configured to continue generating next neural network inputs until an instance of a task has been performed.

10. The neural network system of claim 1, wherein the machine learning task is a task performed for a user of a mobile device.

11. One or more non-transitory computer-readable media storing instructions that when executed by one or more computers cause the one or more computers to perform operations for performing a machine learning task by invoking one or more programs selected from a set of programs that, when invoked, cause an environment to transition into a different state, the operations comprising:

storing, for each program in the set of programs, a key identifying the program and an embedding for the program, wherein the embedding for the program is a collection of numeric values that represents the program, wherein the embeddings for the programs in the set of programs have been determined through training on a set of training data, and wherein one or more of the neural network inputs are generated based on an embedding for one of the programs in the set of programs; and processing a sequence of neural network inputs using a core neural network to generate a sequence of neural network outputs, wherein one or more of the neural network inputs are generated based on an embedding for one of the programs in the set of programs and wherein the processing comprises, for each neural network output:
  determining, from the neural network output, whether or not to call a new program from the set of programs;
  in response to determining to call a new program:
    determining, from the neural network output, a next program to be called;
    determining, from the neural network output, contents of arguments to the next program to be called;
    invoking the next program with the contents of the arguments to the next program to cause the environment to transition into a current state;
    obtaining a representation of the current state of the environment; and
    generating a next neural network input from the representation of the current state of the environment.

12. A method for performing a machine learning task by invoking one or more programs selected from a set of programs that, when invoked, cause an environment to transition into a different state, the method comprising:
  storing, for each program in the set of programs, a key identifying the program and an embedding for the program, wherein the embedding for the program is a collection of numeric values that represents the program, wherein the embeddings for the programs in the set of programs have been determined through training on a set of training data, and wherein one or more of the neural network inputs are generated based on an embedding for one of the programs in the set of programs; and
  processing a sequence of neural network inputs using a core neural network to generate a sequence of neural network outputs, wherein one or more of the neural network inputs are generated based on an embedding for one of the programs in the set of programs and wherein the processing comprises, for each neural network output:
    determining, from the neural network output, whether or not to call a new program from the set of programs;
    in response to determining to call a new program:
      determining, from the neural network output, a next program to be called;
      determining, from the neural network output, contents of arguments to the next program to be called;
      invoking the next program with the contents of the arguments to the next program to cause the environment to transition into a current state;
      obtaining a representation of the current state of the environment; and
      generating a next neural network input from the representation of the current state of the environment.

13. The method of claim 12, wherein generating the next neural network input comprises:
  extracting a state encoding from the representation of the current state using a domain-specific encoder; and
  generating the next neural network input using the state encoding.

14. The method of claim 12, wherein determining the next program to be called comprises:
  determining, from the neural network output, a program key; and
  selecting a program from the set of programs using the program key.

15. The method of claim 14, wherein selecting a program from the set of programs using the program key comprises:
  selecting a program from the set of programs having a key that is most similar to the program key.

16. The method of claim 12, wherein the core neural network has been trained on training data that comprises execution traces.

17. The method of claim 16, wherein the embeddings for the programs in the set of programs have been determined during the training of the core neural network on the training data that comprises the execution traces.

18. The method of claim 12, wherein the core neural network comprises a recurrent neural network.

19. The method of claim 12, wherein the representation of the current state is an image.

20. The method of claim 12, wherein the machine learning task is a task performed for a user of a mobile device.

* * * * *